(12) United States Patent
Schaffer

(10) Patent No.: US 7,512,803 B2
(45) Date of Patent: Mar. 31, 2009

(54) METHOD FOR HANDLING PASSWORD ERRORS

(75) Inventor: Eric M. Schaffer, Fairfield, IA (US)

(73) Assignee: Human Factors International, Inc., Fairfield, IA (US)

( * ) Notice: Subject to any disclaimer, the term of this patent is extended or adjusted under 35 U.S.C. 154(b) by 925 days.

(21) Appl. No.: 10/962,338

(22) Filed: Oct. 8, 2004

(65) Prior Publication Data

US 2006/0080544 A1 Apr. 13, 2006

(51) Int. Cl.
*H04L 9/00* (2006.01)
(52) U.S. Cl. ...................... 713/183; 713/185
(58) Field of Classification Search ................. 713/183, 713/182, 184, 185
See application file for complete search history.

(56) References Cited

OTHER PUBLICATIONS

DOM HTML, W3C Recommendation, year 2003.*
How to Design for Persuasion, Emotion, and Trust, year 2008, printed out in year 2008.*
Choosing passwords: security and human factors Gehringer, E.F.; Technology and Society, 2002. (ISTAS'02). 2002 International Symposium on Jun. 6-8, 2002 pp. 369-373.
User Authentication via Behavior Based Passwords Yampolskiy, R.V.; Systems, Applications and Technology Conference, 2007. LISAT 2007. IEEE Long Island May 4-4, 2007 pp. 1-8.
Graphical Password: Comprehensive Study of the Usability Features of the Recognition Base Graphical Password Methods Eljetlawi, Ali Mohamed; Ithnin, Norafida; Convergence and Hybrid Information Technology, 2008. ICCIT '08. Third International Conference on vol. 2, Nov. 11-13, 2008 pp. 1137-1143.

* cited by examiner

*Primary Examiner*—David Y Jung
(74) *Attorney, Agent, or Firm*—Polsinelli Shughart PC

(57) ABSTRACT

Handling incorrectly entered passwords is accomplished by systems, devices, software and software products, and methods, that treat incorrectly entered passwords as case insensitive rather than rejecting them outright. As such, passwords that would normally be rejected, as a result of being entered incorrectly, typically inadvertently, such as if the "Caps Lock" key on the entering user's keyboard was active or "in" when the password was being typed (entered), are accepted as valid.

33 Claims, 5 Drawing Sheets

METHOD FOR HANDLING PASSWORD ERRORS

FIELD OF THE INVENTION

The present invention pertains to error handling for password entries. In particular, the invention pertains to methods for reducing the common user error of having the "Caps Lock" key, on a standard keyboard or other entry panel, inadvertently actuated.

BACKGROUND OF THE INVENTION

Passwords are used to gain access to computers, computer systems, computer networks, web sites, web applications, and the like. By using passwords, only authorized users are able to log on and access the requisite computer, computer system, computer network, etc., while unauthorized users, such as hackers and imposters, are prevented from obtaining access.

Passwords are typically an assigned or user selected series of characters. Characters commonly include letters, in upper and lower case, numbers, and symbols. For description purposes here, characters are letters, in upper and lower case, and numbers. Passwords are formed from sequences of characters, typically unspaced, that are unique for each user.

When an individual user seeks access to their computer, computer system, computer network, web site, web application, etc., they typically log in by entering their password. If the password exactly matches a correspondingly stored password in the system, the user is granted access to the requisite computer, computer system, computer network, web site, web application, etc. Otherwise, the user is denied access. Additionally, typically after about three failed attempts to enter the proper password, the requisite computer, system or network, denies access to the account, for which the entry has failed, by locking that account, with unlocking occurring after a preset time period, and normally, by a system administrator.

As enterprises seek to increase security for their web sites, computers, computer systems, and networks, their systems are programmed to recognize passwords that are case sensitive. By imposing case sensitivity, passwords are more powerful, as password matches must be precise. As a result, the password fRed257 is not the same as fred257 or FRED257. By mixing case, it is harder for imposters and other unauthorized users to guess passwords.

However, authorized users sometimes enter their passwords incorrectly, because they have accidentally actuated the "Caps Lock" key on their keyboard or other entry panel, at some point before or during the entry of the password characters. This actuated "Caps Lock" key results in the password being rejected. With the password rejected, the user is denied access to the system.

Similarly, if a user enters their password by pressing the correct keys, but not knowing that the "Caps Lock" key is active or "in", the resultant and actually entered password has letter characters opposite in case to the letter characters typed, as the intended password. The entered password is refused, and access to the system is denied.

In both situations, most users do not recognize the problem immediately or easily, since they have pressed the correct key sequence. As a result, these users become frustrated and call their technical support personnel for assistance. The costs for handling these support calls is significant, as manpower is diverted to attend to these support calls, taking personnel away from the more important tasks of running the day to day operations of maintaining the network.

Additionally, this refusal of the user's password, from either of the two situations above, is often compounded by the obscuration of password characters. This is because the user can not tell from looking at the password field that the problem occurred as a result of the "Caps Lock" key being active or "in" when the password was entered. This is normally because the actual characters that form the password are indicated on-screen by asterisks (*) or the like, whereby the user can not see the characters that will be sent and used as the entered password.

SUMMARY OF THE INVENTION

The present invention improves on the contemporary art by providing systems, software and methods (processes) for handling incorrectly entered passwords. For example, incorrectly entered passwords include letter characters that have been entered with unintentional errors, particularly the opposite case of the actually intended case for one or more letter characters of the letter characters included in the password. In particular, the present invention improves on the contemporary art by providing systems, software and methods for reducing incorrectly entered passwords, typically entered incorrectly inadvertently, due to the "Caps Lock" key on the user's keyboard being active or "in", when the password is being typed (entered) into the system. As a result of these methods, costs associated with providing support to assist users who have incorrectly entered their passwords is reduced.

An embodiment of the invention is directed to a method for handling incorrect password entries. The method includes, receiving at least one entered password, treating the letter characters of the at least one entered password as case insensitive when the letter characters of the at least one entered password are all upper case, and, comparing the case insensitive letter characters of the at least one entered password with the letter characters of a stored password to determine if there is a match between the at least one entered password and the stored password.

Another embodiment of the invention is directed to a machine-readable medium, for example, software or a software product, typically in the form of a disc or the like. The machine readable medium provides instructions which, when executed by a machine, for example, a computer, server, or the like, cause the machine to perform operations for handling incorrect password entries. The operations to be performed include, receiving at least one entered password, treating the letter characters of the at least one entered password as case insensitive when the letter characters of the at least one entered password are all upper case, and comparing the case insensitive letter characters of the at least one entered password with the letter characters of a stored password to determine if there is a match between the at least one entered password and the stored password.

Another embodiment of the invention is directed to a system for handling incorrect password entries. The system includes, a component for receiving at least one entered password, a component for treating the letter characters of the at least one entered password as case insensitive when the letter characters of the at least one entered password are all upper case, and, a component for comparing the case insensitive letter characters of the at least one entered password with the letter characters of a stored password to determine if there is a match between the at least one entered password and the stored password.

Another embodiment of the invention is directed to a device for handling incorrect password entries. The device includes at least one storage medium for storing at least one password, and a processor in communication with the at least one storage medium. The processor is programmed to: receive at least one entered password, treat the letter characters of the at least one entered password as case insensitive when the letter characters of the at least one entered password are all upper case; and, compare the case insensitive letter characters of the at least one entered password with the letter characters of the at least one stored password to determine if there is a match between the at least one entered password and the at least one stored password. The stored password may include all letter characters in lower case. A match between the at least one entered password and the stored password is considered to have occurred when the case insensitive letter characters of the at least one entered password are the same and in the exact order of the letter characters of the stored password. Additionally, the at least one storage medium is configured for storing at least one user name associated with the at least one password and the processor is additionally programmed to match an entered user name associated with the at least one entered password with a stored user name. If the user names match, the processor proceeds to receiving the at least one entered password.

BRIEF DESCRIPTION OF THE DRAWINGS

Attention is now directed to the drawing figures, where like numbers or characters indicate corresponding or like components. In the drawings.

DETAILED DESCRIPTION

Figure 1A:
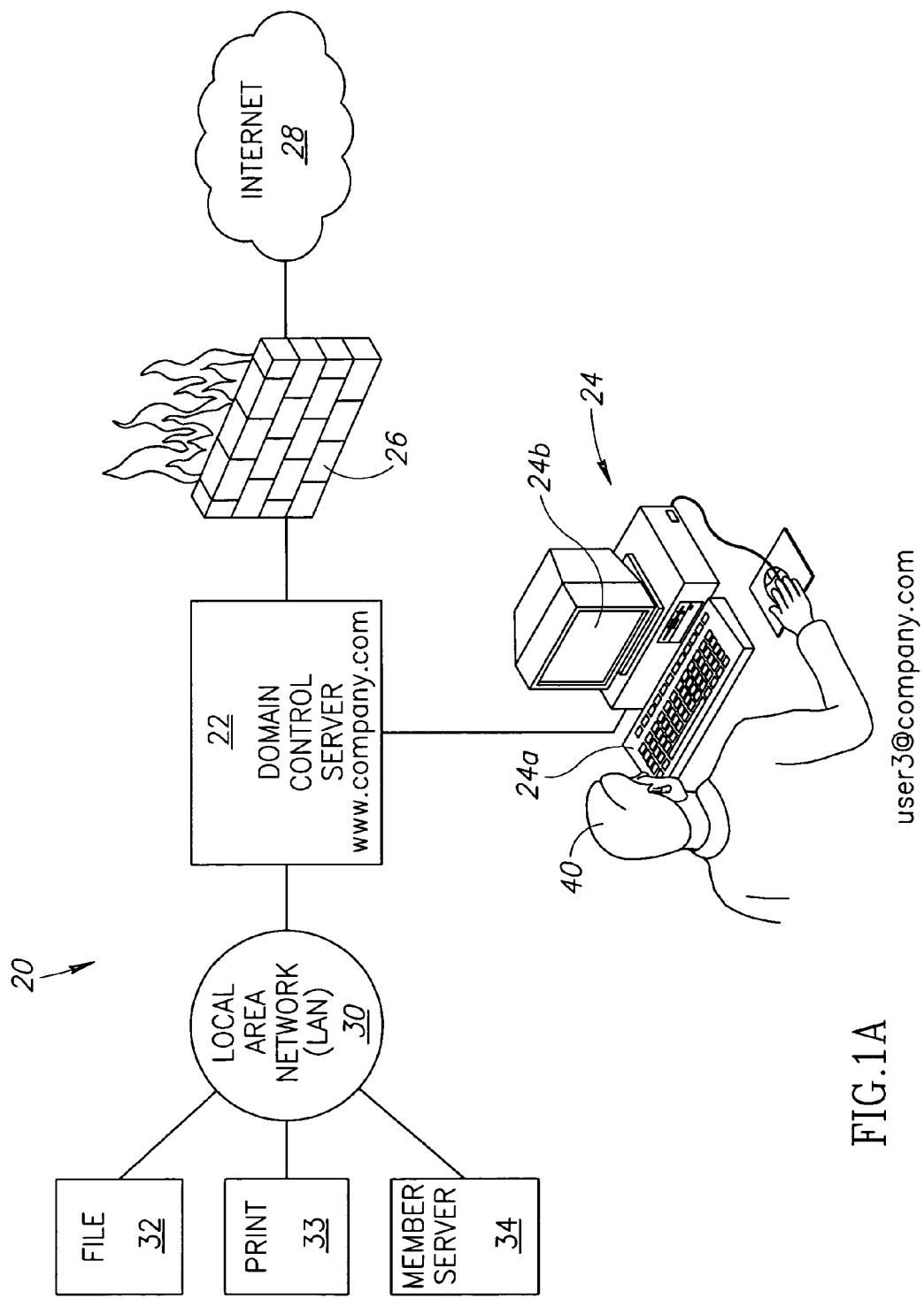
FIG. 1A is an exemplary system on which embodiments of the invention may be performed.

FIG. 1A shows an exemplary system 20 on which the invention may be performed. The system 20 includes domain servers or controllers 22, typically with redundant back up domain controllers (not shown). The domain controllers (domain servers) 22 (only one shown as an example), are typically servers, with authorization, Domain Name System (DNS) and Windows Internet Naming Service (WINS) functionalities. The domain controller 22 controls access for the user's computer 24 (personal computer, workstation or the like) through a firewall 26, to a Wide Area Network (WAN), such as the Internet 28, or a Local Area Network (LAN) 30. The LAN 30 may include servers such as file servers 32, print servers 33 and member servers 34 (only one of each shown as an example).

The user 40, whose e-mail address is, for example, user3@company.com, and has a user name or user identifier, for example, as "user3", enters their user name (user name) and password (associated with this user name or user identifier) into the computer 24 (work-station or other computing or computer-type device), by strokes of keys on the associated keyboard 24a, in order to access the WAN and the LAN.

Figure 1B:
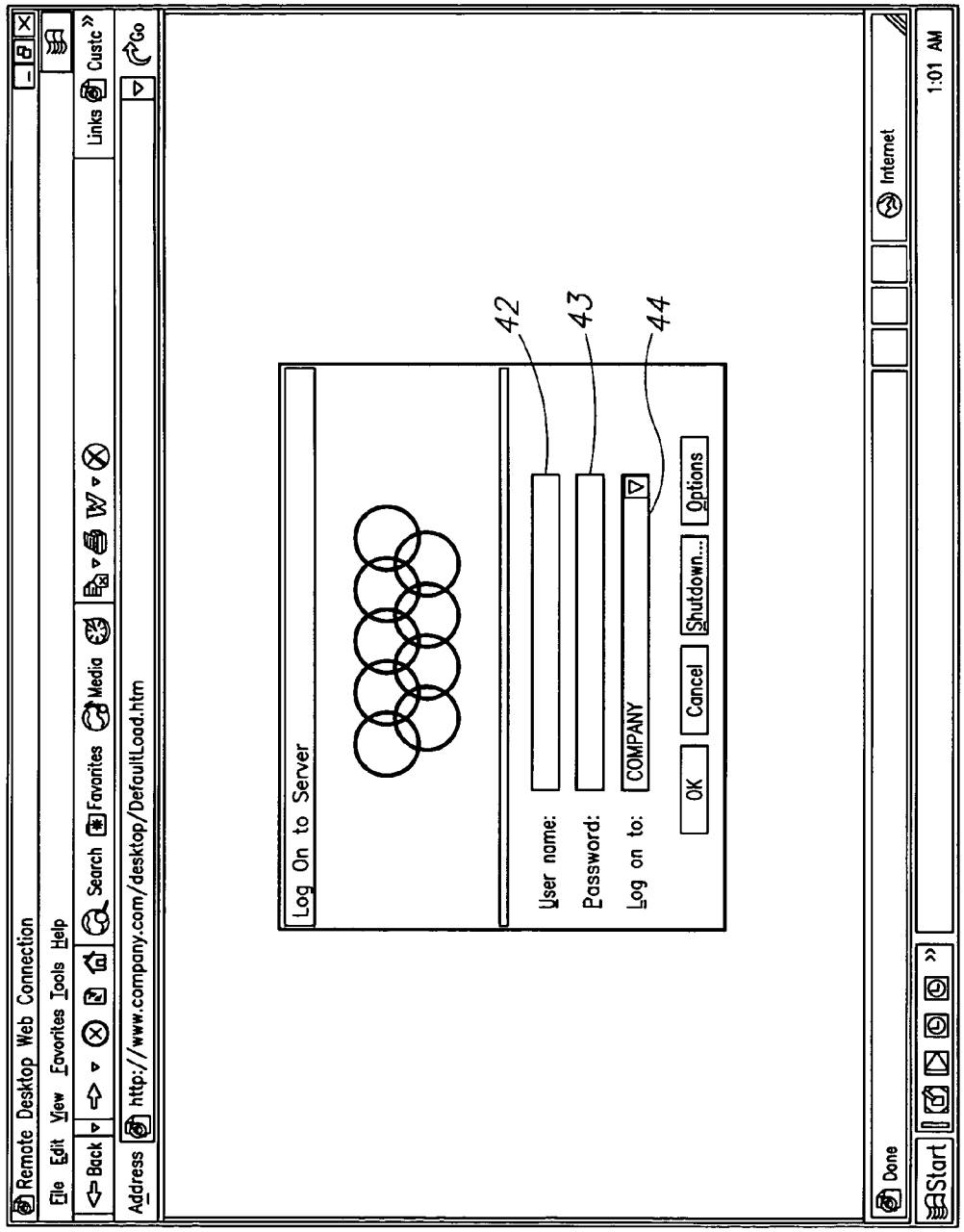
FIG. 1B is an exemplary screen shot on which a user name and password are entered.
Figure 1C:
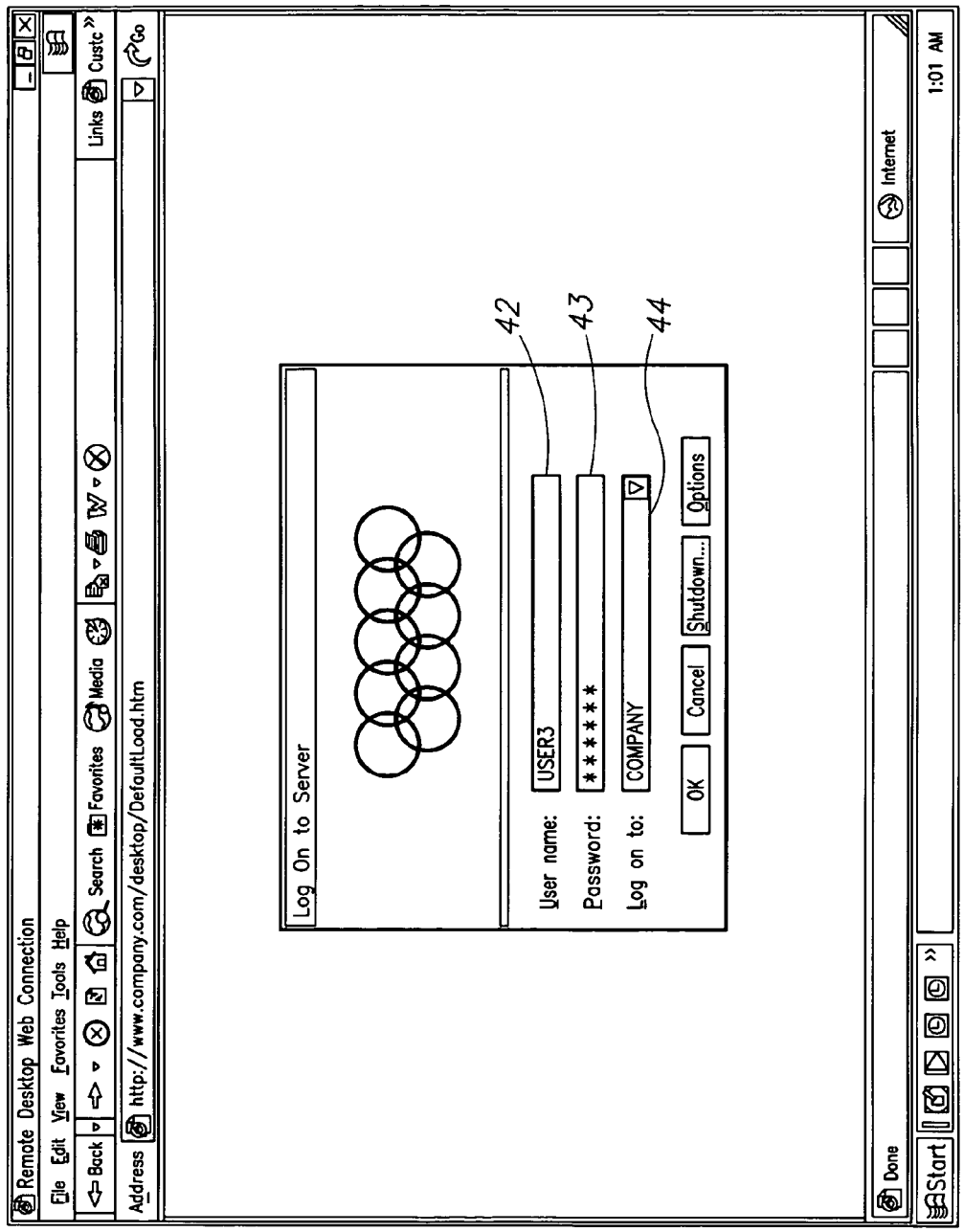
FIG. 1C is an exemplary screen shot where the user name and password have been entered.

A welcome screen, as shown in FIG. 1B appears on the monitor 24b of the computer 24 with blocks for the user name 42, password 43 and the domain 44. The user name appears as typed in the block 42, while the password typically appears as asterisks (*) when typed into the password block 43, to maintain the secrecy and security of the password, as shown in FIG. 1C. In both FIG. 1B and FIG. 1C, the domain is typically in a block, such as block 44, with an exemplary domain being for the enterprise, whose network will be accessed. The domain for the exemplary enterprise is, for example, "company", with the corresponding World Wide Web (WWW) address or www.company.com.

The keyboard 24a is a standard keyboard, for use with a personal computer (PC) or the like, that includes at least one key, labeled "Caps Lock". When the "Caps Lock" key is activated or "in", the resultant case of the letter character is opposite the case actually entered, had the "Caps Lock" key not been activated. The "Caps Lock" key, when activated or "in", normally does not affect numbers (and for explanation purposes in this document, numbers will not be affected by the "Caps Lock" key).

The entered user name and password are then sent to the domain controller 22, where they are analyzed and subsequently authorized or rejected, to permit or deny access for computer user 40. In this figure, for example, the authorized user 40 would have the user name "user3" and a predetermined password. These two items would be entered into the computer 24 and would appear on the monitor 24b in the blocks 42 (for user name) and 43 (for password), as detailed above.

Figure 2:
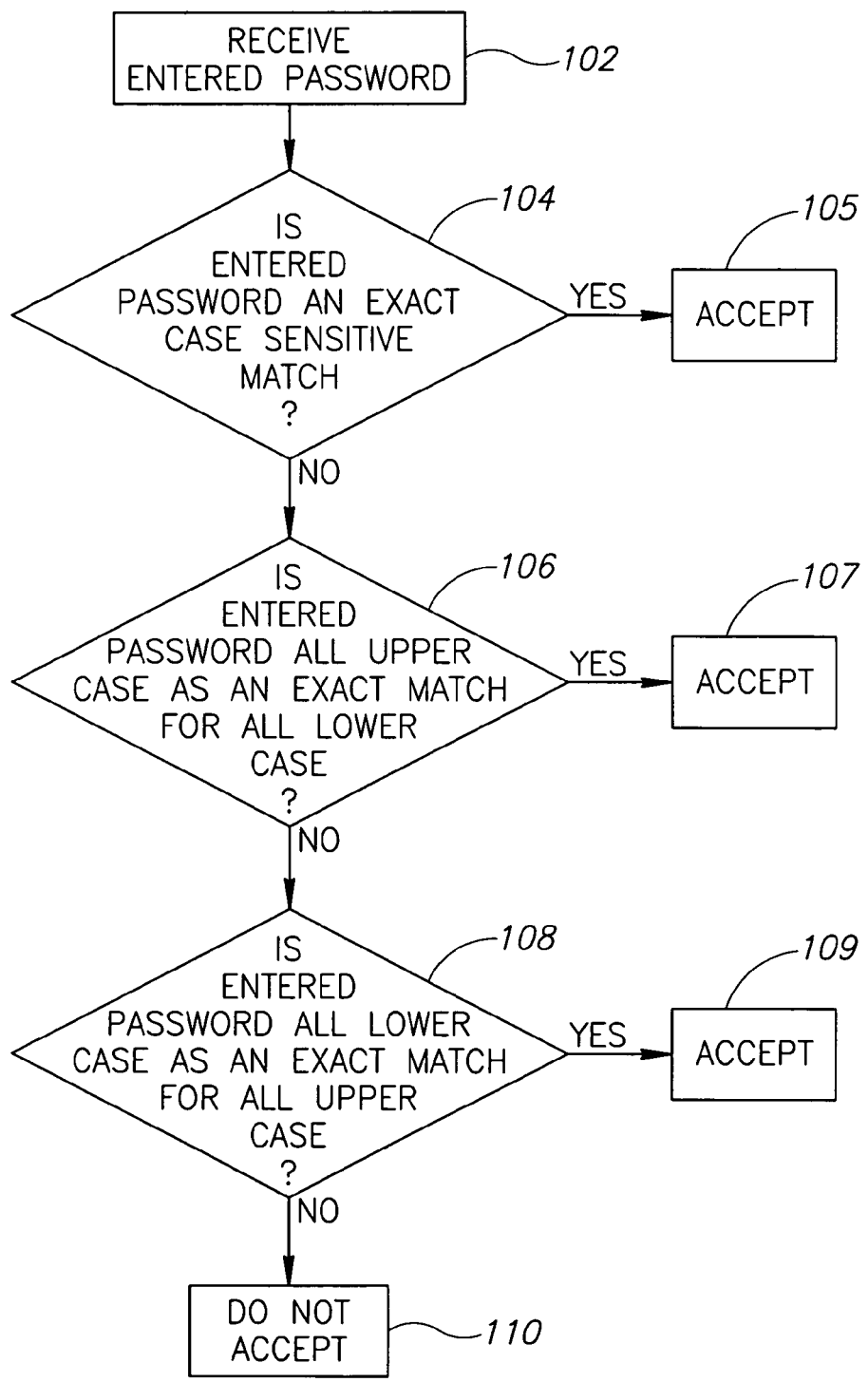
FIG. 2 is a flow diagram of a process in accordance with an embodiment of the invention.

FIG. 2 is a flow diagram detailing a method (process) in accordance with the invention. The method is typically performed within the domain controller 22, and could also be performed by the domain controller 22 and additional related components. The domain controller 22 and any additional components may include processors, memory, network interfaces, storage media, databases, comparison modules (e.g., that determine matches between user names, passwords, and other data) and other hardware, software or combinations thereof, and can be arranged in various systems and architectures. Alternately, the method is performed on the computer itself, if being used on an individual personal computer (PC), to access it.

The method can also be performed on software or other machine-readable medium that includes any mechanism that provides (i.e., stores and/or transmits) information in a form readable by a machine (e.g., a computer, server or other computer-type apparatus). For example, a machine-readable medium includes read only memory (ROM); random access memory (RAM); magnetic disk storage media, such as Compact Discs (CDs) and the like; optical storage media; flash memory devices; electrical, optical, acoustical or other form of propagated signals (e.g., carrier waves, infrared signals, digital signals, etc.); etc.

For purposes of description, the passwords will be described as an entered password, a password that is entered by the user (or any other person or entity, authorized or unauthorized) seeking to obtain access to the network, and a stored password, the password stored in the domain controller or other storage media with the user name or the like. If the entered password matches the stored password identically, the characters match in the identical order (correct position for each character in the proper sequence), and case (for the letter characters), the user is permitted access to the network. While the entered password is typically associated with a user name, the analysis of the password will be detailed, as the association with the user name serves as an additional security measure, that is conventional.

Also, for purposes of describing the invention, the passwords used will be letter characters only, of any case, upper, lower or mixed, and in the proper order, in the identical sequence for the characters absent any spaces. The differences between the entered password and the stored password will be the case of the letter characters, to illustrate the invention.

Although in a practical operation, passwords may include other characters, such as numbers and special characters, for example, punctuation marks, symbols, in addition to the letter characters. The number characters and special characters are not normally affected by the process of the invention, and as such, need only be in their proper order in the password. If the entered password does not match the stored password, due to there being one or more incorrect characters, a missing character, one or more characters being out of order, or an incorrect spacing between one or more of the characters, the password will be analyzed in accordance with the process of the flow diagram, but will be rejected, where access to the network will be denied.

Initially, at block 102, the entered password is received at the domain controller 22. In particular, the password is received by the authorization function of the domain controller 22. The user name associated with the entered password has also been received, and is typically matched with a stored user name, so that entered password can be compared to the stored password, associated with the matching stored user name. By matching the user names, the system can be accessed and the process of the invention for analyzing the entered and stored passwords, associated with the same (matching) user name, can begin. However, for purposes of describing the invention, the user names associated with the entered and stored passwords will be considered to be a match, such that attention is directed to analysis of the entered password with respect to the stored password. For example, returning to FIGS. 1A-1C, the entered user name (user identifier) "user3" will cause a search mechanism in the domain controller 22, to query a storage media for the matching stored user name (user identifier) "user3". If the stored user name "user3" is found, the passwords associated with the entered user name ("user3") and the stored user name ("user3") may then be analyzed by the process (method) described below.

The process moves to block 104, where the entered password is queried against the stored password, to see if there is an exact case sensitive match. The exact case sensitive match must also have all characters in the exact case and order of the stored password, absent any spaces between characters or additional characters. If there is an exact match, the entered password is accepted, at block 105, and the user is admitted to the network.

If there is not an exact match, the process moves to block 106. At this block, case sensitivity is initially taken into account when querying the entered password against the stored password. Specifically, the entered password is queried against the stored password to see if it is all upper case, but otherwise exactly matching the stored password, whose letter characters are all lower case. If all of the characters of the entered password are matching, and match in the exact order of those of the stored password, except that all of the letter characters of the entered password are in upper case (as opposed to lower case for the letters of the stored password), the password is treated as case insensitive, and is accepted, at block 107. The user is admitted to the network.

Otherwise, the process moves to block 108. Block 108 is the opposite of block 106. Like block 106, case sensitivity is taken into account in initially analyzing the entered password.

At block 108, the entered password is queried against the stored password to determine if it is all lower case, but otherwise exactly matching the stored password, whose letter characters are all in upper case. If all of the characters of the entered password are matching, and match in the exact order of those of the stored password, except that all of the letter characters of the entered password are in lower case (as opposed to upper case for the letters of the stored password), the password is treated as case insensitive and is accepted, at block 109. The user is admitted to the network. Block 108 is typically an uncommon instance, as passwords are seldom in all upper case (capital) letters.

Otherwise, the process moves to block 110. At this block, the user's entered password has not been accepted, as there has not been a match of the entered password to the stored password. This is probably due to a password being entered where one or more of the characters is incorrect, the order of the characters is different including spacing between the characters is different. The user remains without access to the network.

Exemplary operations in accordance with the invention will now be described by the following examples.

EXAMPLE 1

Entered Password: FLowEr

Stored Password: FLowEr

In this example, the entered password, received at block 102, is an exact and identical match of characters, case and their order. Accordingly, the match occurs at block 104, the password is accepted, at block 105, and the user is permitted access to the network.

EXAMPLE 2

Entered Password: GARDEN

Stored Password: garden

In this example, the entered password, received at block 102, is a match of characters and order with the stored password. However, it is not an identical match of case with the stored password. Accordingly, at block 104, the password would not be accepted, and the process would move to block 106. At block 106, the entered password is all upper case and it is an exact match for the lower case stored password. Accordingly, the entered password may have been entered with the "Caps Lock" key activated, such that "garden" typed into the system became the entered password "GARDEN". In accordance with the invention, the entered password "GARDEN" is considered to be a match for the stored password "garden", whereby the entered password is accepted, at block 107, and the user may access the network.

EXAMPLE 3

Entered Password: tulips

Stored Password: TULIPS

In this example, the entered password, received at block 102, is a match of characters and order with the stored password. However, it is not an identical match of case with the stored password. Accordingly, at block 104, the password would not be accepted, and the process would move to block 106.

At block 106, the entered password is not in all upper case and the stored password is not in all lower case, so the entered password is not accepted, and the process moves to block 108. At block 108, the entered password is all lower case and it is an exact match for the upper case stored password. Accordingly, the entered password may have been entered with the "Caps Lock" key activated, such that "TULIPS" typed into the system became the entered password "tulips". In accordance with the invention, the entered password "tulips" is considered to be a match for the stored password "TULIPS", whereby the entered password is accepted, at block 109, and the user may access the network.

EXAMPLE 4

Entered Password: garden

Stored Password: GarDen

In this example, the entered password, received at block 102, is a match of characters and order with the stored password. However, it is not an identical match of case with the stored password. Accordingly, at block 104, the password would not be accepted, and the process would move to block 106.

At block 106, the entered password is not in all upper case and the stored password is not in all lower case, so the entered password is not accepted, and the process moves to block 108. At block 108, the entered password is all lower case and it is a character match for the stored password, but not an exact case match for all of the characters, due to the "G" and "D" of the stored password "GarDen". The entered password is not accepted and the process moves to block 110, where the entered password of "garden" is rejected. The user is denied access to the network.

EXAMPLE 5

Entered Password: GARDEN

Stored Password: GarDen

In this example, the entered password, received at block 102, is a match of characters and order with the stored password. However, it is not an identical match of case with the stored password. Accordingly, at block 104, the password would not be accepted, and the process would move to block 106.

At block 106, the entered password is all upper case and the stored password is not in all lower case, so there is not an exact case match. The entered password is not accepted, and the process moves to block 108. At block 108, the entered password is all upper case and it is a character match for the stored mixed case password, but not an exact case match for all of the characters, due to the "ar" and "en" of the stored password "GarDen". The entered password is not accepted and the process moves to block 110, where the entered password of "GARDEN" is rejected. The user is denied access to the network.

EXAMPLE 6

Entered Password: tulipd

Stored Password: TULIPS

In this example, the entered password, received at block 102, is a not a match of charters and order with the stored password, the entered password has a character "d" different from the stored password. The entered password is not accepted and the process moves to block 106.

Again, as with block 104, there is not an exact character match, due to the "d" of the entered password. The entered password is not accepted and the process moves to block 108.

As with blocks 104 and 106, there is not an exact character match, due to the "d" of the entered password. The entered password is not accepted and the process moves to block 110, where the entered password of "tulipd" is rejected. The user is denied access to the network.

Figure 3:
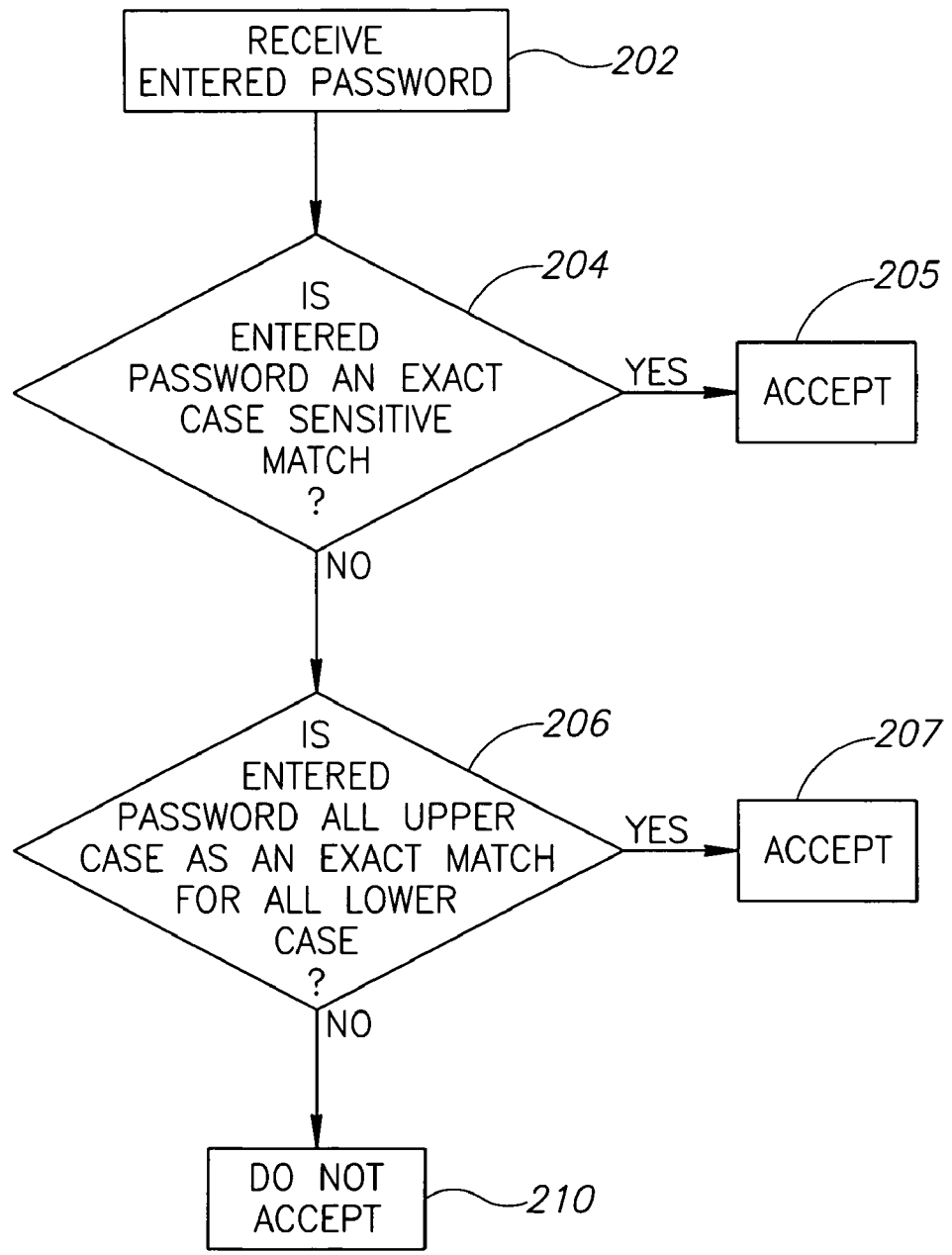
FIG. 3 is a flow diagram of an alternate process in accordance with another embodiment of the present invention.

FIG. 3 is a flow diagram detailing an alternate method (process) in accordance with the invention. The method is similar to the method described in FIG. 2, with similar blocks indicated by being numbered in a "200" series, and is operable on the same computer components (hardware and software or combinations thereof) and software or machine readable medium detailed above. This embodiment is based on the probability that most errors, due to the "Caps Lock" key being activated or "in", result from characters entered in what is believed to be lower case, but result as upper case, as the password actually entered.

Initially, at block 202, the entered password is received at the domain controller 22. In particular, the password is received by the authorization function of the domain controller 22. Similar to the process described above in FIG. 2 and the "100" series blocks, the user name (user identifier) associated with the entered password has also been received, and is typically matched with a stored user name (user identifier). If the user names (user identifiers) match, password analysis, as described below, begins, but for purposes of description, attention is directed to the password analysis.

The process moves to block 204, where the entered password is queried against the stored password, to see if there is an exact case sensitive match. The exact case sensitive match must also have all characters in the exact case and order of the stored password, absent any spaces between characters or additional characters. If there is an exact match, the entered password is accepted, at block 205, and the user is admitted to the network.

If there is not an exact match, the process moves to block 206. At this block, case sensitivity is initially taken into account when querying the entered password against the stored password. Specifically, the entered password is queried against the stored password to see if it is all upper case, but otherwise exactly matching the stored password, whose letter characters are all lower case. If all of the characters of the entered password are matching, and match in the exact order of those of the stored password, except that all of the letter characters of the entered password are in upper case (as opposed to lower case for the letters of the stored password), the password is treated as case insensitive, and is accepted, at block 207. The user is admitted (permitted access) to the network or other facility.

Otherwise, the process moves to block 210. At this block, there has not been a match of the entered password to the stored password. Accordingly, the entered password is not accepted and the user is not permitted access to the network.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for handling an entry of an incorrect password to access a computer, each password comprising letter characters, the method comprising:
    receiving at least one entered password from a user requesting access to the computer;
    treating the letter characters of the at least one entered password as case insensitive when the letter characters of the at least one entered password are all upper case;
    comparing the case insensitive letter characters of the at least one entered password with the letter characters of a stored password to determine if there is a match between the at least one entered password and the stored password; and
    enabling the user access to the computer when the case insensitive letter characters of the at least one entered password match the letter characters of the stored password and when the letter characters of the stored password have the same case.

2. The method of claim 1, wherein the stored password includes all letter characters in lower case.

3. The method of claim 2, wherein there is a match between the at least one entered password and the stored password when the case insensitive letter characters of the at least one entered password are the same and in the exact order of the letter characters of the stored password.

4. The method of claim 3, wherein the user associated with the at least one entered password is permitted access to at least one of a requisite computer, function, network or system, when there is a match between the at least one entered password and the stored password.

5. The method of claim 1, wherein the at least one entered password and the stored password whose letter characters are being compared are associated with a same user name.

6. The method of claim 1, additionally comprising: storing a password associated with a user name.

7. The method of claim 6, wherein receiving at least one entered password includes receiving at least one entered password associated with a user name.

8. The method of claim 7, wherein the at least one entered password and the stored password whose letter characters are being compared are associated with the same user name.

9. The method of claim 1, wherein, if the letter characters of the at least one entered password are all lower case, the method additionally comprises:
    treating the letter characters of the at least one entered password as case insensitive; and,
    the stored password includes all letter characters in upper case.

10. The method of claim 9, wherein there is a match between the at least one entered password and the stored password when the case insensitive letter characters of the at least one entered password are the same and in the exact order of the letter characters of the stored password.

11. The method of claim 10, wherein the user associated with the at least one entered password is permitted access to at least one of a requisite computer, function, network or system, when there is a match between the at least one entered password and the stored password.

12. A computer readable medium encoded with instructions executable by a processor for handling entry of an incorrect password to access a computer, each password comprising letter characters, the instructions comprising:
    determining a case of each of the letter characters included in an entered password received at the processor;
    treating the letter characters of the at least one entered password as case insensitive when the letter characters of the entered password are all upper case;
    comparing the case insensitive letter characters of the at least one entered password with the letter characters of a stored password to determine if there is a match between the at least one entered password and the stored password; and
    enabling access to the computer when the case insensitive letter characters of the at least one entered password match the letter characters of the stored password and when the letter characters of the stored password have the same case.

13. The computer readable medium of claim 12, wherein the stored password includes all letter characters in lower case.

14. The computer readable medium of claim 13, wherein there is a match between the at least one entered password and the stored password when the case insensitive letter characters of the at least one entered password are the same and in the exact order of the letter characters of the stored password.

15. The computer readable medium of claim 14, wherein the operations additionally comprise:
    authorizing the requisite access to a machine associated with a user, the user associated with the at least one entered password, if there is a match between the at least one entered password and the stored password.

16. The computer readable medium of claim 12, wherein the operations additionally comprise: storing a password associated with a user name.

17. The computer readable medium of claim 16, wherein receiving at least one entered password includes receiving at least one entered password associated with a user name.

18. The computer readable medium of claim 17, wherein the at least one entered password and the stored password whose letter characters are being compared are associated with the same user name.

19. The computer readable medium of claim 12, wherein the operation additionally comprises:
    treating the letter characters of the at least one entered password as case insensitive, if the letter characters of the at least one entered password are all lower case and the stored password includes all letter characters in upper case.

20. The computer readable medium of claim 19, wherein there is a match between the at least one entered password and the stored password when the case insensitive letter characters of the at least one entered password are the same and in the exact order of the letter characters of the stored password.

21. The computer readable medium of claim 20, wherein the operations additionally comprise:
    authorizing the requisite access to a machine associated with a user, the user associated with the at least one entered password, if there is a match between the at least one entered password and the stored password.

22. A system for handling incorrect password entries to access a computer, each password comprising letter characters, the system comprising:
    a user interface component for receiving at least one entered password; and
    a processing component for:

treating the letter characters of the at least one entered password as case insensitive when the letter characters of the at least one entered password are all upper case;

comparing the case insensitive letter characters of the at least one entered password with the letter characters of a stored password to determine if there is a match between the at least one entered password and the stored password; and enabling access to the computer when the case insensitive letter characters of the at least one entered password match the letter characters of the stored password and the letter characters of the stored password have the same case.

23. The system of claim 22, additionally comprising: at least one storage media for storing passwords and storing the at least one entered password.

24. The system of claim 23, wherein the processing component is configured for determining a match between the at least one entered password and the stored password when the case insensitive letter characters of the at least one entered password are the same and in the exact order of the letter characters of the stored password.

25. The system of claim 24, wherein the processing component is configured for permitting a machine associated with a user associated with the at least one entered password, to access at least one of the computer, function, network or system, when there is a match between the at least one entered password and the stored password.

26. The system of claim 22, wherein the at least one storage media is configured for storing a user name associated with a stored password.

27. The system of claim 22, wherein the processing component is configured for treating the letter characters of the at least one entered password as case insensitive, if the letter characters of the at least one entered password are all lower case, and, the stored password includes all letter characters in upper case.

28. The system of claim 27, wherein the processing component is configured for determining a match between the at least one entered password and the stored password when the case insensitive letter characters of the at least one entered password are the same and in the exact order of the letter characters of the stored password.

29. The system of claim 28, wherein the processing component is configured for permitting a machine associated with a user associated with the at least one entered password, to access at least one of the computer, function, network or system, when there is a match between the at least one entered password and the stored password.

30. A device for handling incorrect password entries to access a computer, each password comprising letter characters, the device comprising:

at least one storage medium for storing at least one password; and a processor in communication with the at least one storage medium, the processor programmed to:

receive at least one entered password;

treat the letter characters of the at least one entered password as case insensitive when the letter characters of the at least one entered password are all upper case;

compare the case insensitive letter characters of the at least one entered password with the letter characters of the at least one stored password to determine if there is a match between the at least one entered password and the at least one stored password; and enable access to the computer when the case insensitive letter characters of the at least one entered password match the letter characters of the stored password and when the letter characters of the stored password have the same case.

31. The device of claim 30, wherein the stored password includes all letter characters in lower case.

32. The device of claim 31, wherein there is a match between the at least one entered password and the stored password when the case insensitive letter characters of the at least one entered password are the same and in the exact order of the letter characters of the stored password.

33. The device of claim 32, wherein the at least one storage medium is configured for storing at least one user name associated with the at least one password and the processor is additionally programmed to match an entered user name associated with the at least one entered password with a stored user name, and if the user names match, proceed to receiving the at least one entered password.

* * * * *

UNITED STATES PATENT AND TRADEMARK OFFICE
CERTIFICATE OF CORRECTION

PATENT NO. : 7,512,803 B2  Page 1 of 1
APPLICATION NO. : 10/962338
DATED : March 31, 2009
INVENTOR(S) : Eric M. Schaffer It is certified that error appears in the above-identified patent and that said Letters Patent is hereby corrected as shown below:

At Column 11, line 13, change "and the" to --and when the--.

Signed and Sealed this

Fifth Day of May, 2009

JOHN DOLL
*Acting Director of the United States Patent and Trademark Office*